United States Patent

Sato et al.

[11] Patent Number: 6,134,196
[45] Date of Patent: Oct. 17, 2000

[54] CARRIAGE CONTROLLER FOR MULTI-LAYER DISC

[75] Inventors: Takeshi Sato; Takashi Suzuki; Hiroyuki Abe; Hideaki Watarihana; Alex Bradshaw; Motoi Kimura; Kenichi Takahashi, all of Kawagoe, Japan

[73] Assignee: Pioneer Electronic Corporation, Tokyo, Japan

[21] Appl. No.: 09/113,225

[22] Filed: Jul. 10, 1998

[30] Foreign Application Priority Data

Jul. 15, 1997 [JP] Japan ..................... 9-189535

[51] Int. Cl.$^7$ ........................... G11B 7/00
[52] U.S. Cl. ............... 369/44.27; 369/94; 369/58; 369/59
[58] Field of Search ................. 369/51, 56, 59, 369/44.27, 44.25, 94, 58, 32

[56] References Cited

U.S. PATENT DOCUMENTS

5,978,322  11/1999  Sugimoto et al. .............. 369/59

Primary Examiner—Nabil Hindi
Attorney, Agent, or Firm—Perman & Green, LLP

[57] ABSTRACT

A carriage controller for a multi-layer disc which is capable of performing a stable carriage control during reproduction of a multi-layer disc of the opposite recording scheme. A tracking error signal is relayed by an equalizer, and a carriage motor is driven in accordance with an output signal of the equalizer. An information reading direction on a layer of a disc on which a pickup reads information is detected, and an equalizer characteristic is set in the equalizer in accordance with the detection result.

10 Claims, 11 Drawing Sheets

CARRIAGE CONTROLLER FOR MULTI-LAYER DISC

BACKGROUND OF THE INVENTION

1. Field of the Invention

The present invention relates to a carriage controller for use in a reproducing apparatus for reproducing a multi-layer disc.

2. Description of the Related Art

Figure 1:
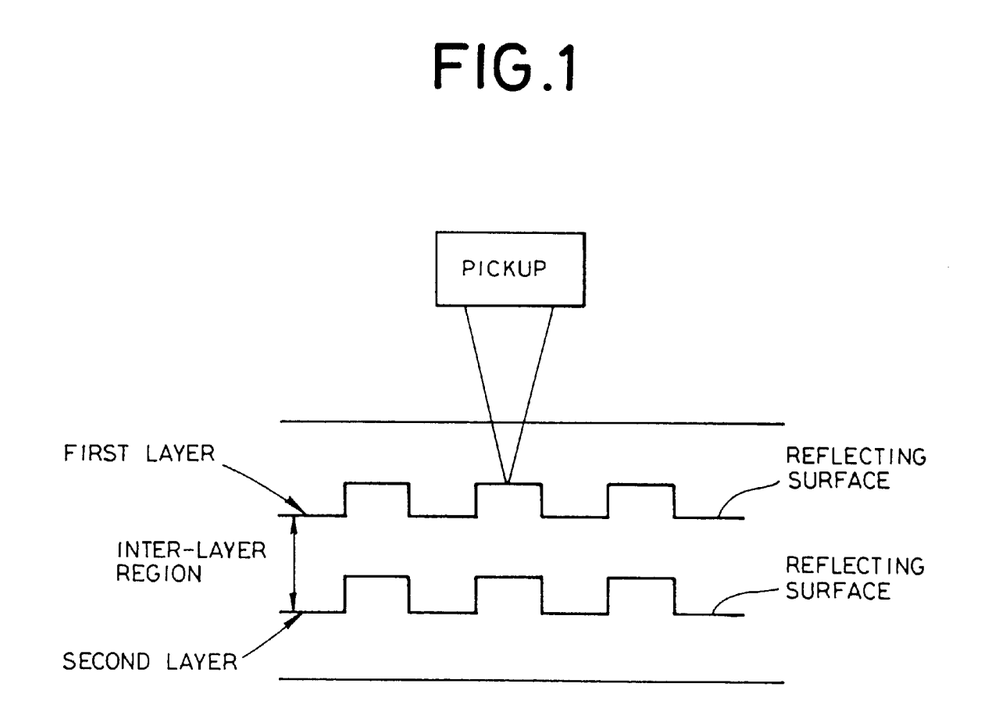
FIG. 1 is a diagram illustrating a cross-section of a two-layer optical disc.

For increasing a recording density on a disc, there is a method of multiplexing information in a direction perpendicular to the surface of the disc. A multi-layer optical disc is a medium which enables such recording of multiplexed information in the perpendicular direction. With a two-layer optical disc, for example, a first layer and a second layer are formed with a spacer region interposed therebetween, as illustrated in FIG. 1, wherein a reflective layer of the first layer, closer to a light irradiated surface of the disc, is made of a translucent film, so that light transmits the first layer to reach the second layer.

For such a multi-layer optical disc, a so-called opposite recording scheme may be employed, where information to be reproduced is read in reading directions opposite to each other from the first layer and from the second layer. For example, information is read from the inner peripheral side to the outer peripheral side of the disc on the first layer, while information is read from the outer peripheral side to the inner peripheral side on the second layer.

Therefore, during reproduction of a disc on which information has been recorded in conformity to the opposite recording scheme, a rotating direction of a carriage motor for moving a pickup in a radial direction of the disc must be switched in accordance with a layer from which information is to be read.

OBJECT AND SUMMARY OF THE INVENTION

However, since the carriage motor requires different starting voltages for forward rotation and backward rotation, this causes a difference in movements of the pickup over two layers on which information is read in different reading directions during reproduction of a disc recorded in conformity to the opposite recording scheme, for example, over the first layer and the second layer, thus making it difficult to provide a stable carriage control on either of the two layers.

It is therefore an object of the present invention to provide a carriage controller for a multi-layer disc which is capable of achieving a stable carriage control during reproduction of a multi-layer optical disc on which information has been recorded in conformity to the opposite recording scheme.

A carriage controller for a multi-layer disc according to the present invention is suitable for use in reproduction of a disc having an information recording surface on each of at least two layers formed in a direction perpendicular to a surface of the disc, and comprises a pickup for reading information recorded on each layer of the disc, a carriage motor for moving the pickup in a radial direction of the disc, equalizer means for relaying a tracking error signal, means for driving the carriage motor in response to an output signal of the equalizer means, and characteristic setting means for detecting an information reading direction on a layer from which information is to be read to set an equalizer characteristic in the equalizer means in accordance with the detection result.

DESCRIPTION OF THE PREFERRED EMBODIMENTS

An embodiment of the present invention will hereinafter be described in detail with reference to the accompanying drawings.

Figure 2:
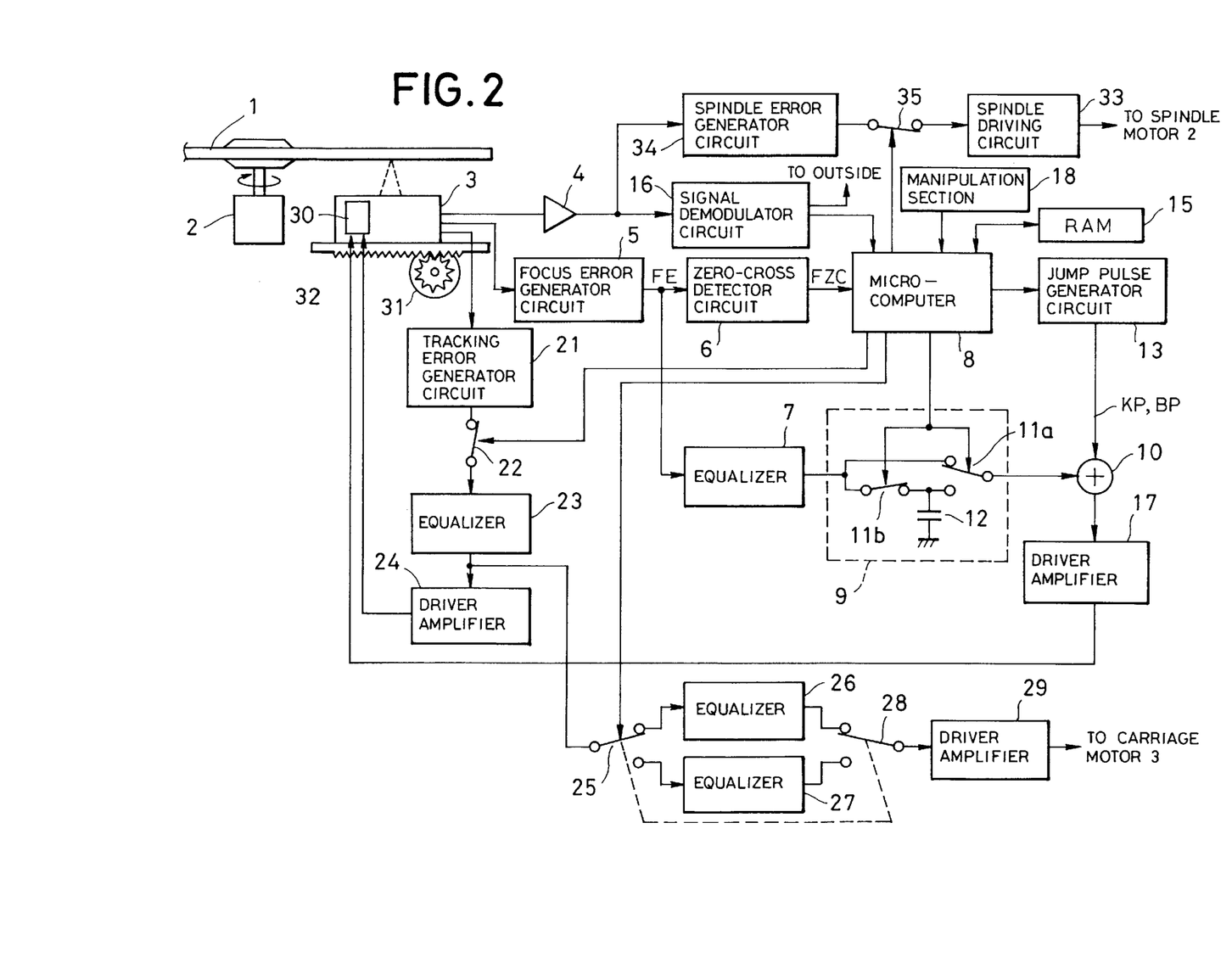
FIG. 2 is a block diagram illustrating the configuration of a player to which a carriage controller of the present invention is applied.

FIG. 2 illustrates a general configuration of a two-layer optical disc player which employs a carriage controller according to an embodiment of the present invention.

Referring specifically to FIG. 2, a disc loaded (set) in a player is a two-layer optical disc, previously illustrated in FIG. 1, which is rotated or driven by a spindle motor 2 and irradiated with reading light emitted from a pickup 3. The reading light reaches a recording surface (reflecting surface) of a first layer or a second layer through a protective layer of the disc 1, modulated by so-called recording marks representing recorded information, such as pits or the like, formed in the recording surface of the disc 1, and then returns to the pickup 3 as reflected light from the recording surface.

The pickup 3 not only emits the reading light but also performs optoelectric transducing which involves receiving reflected light from the disc 1 and generating a variety of electrical signals in accordance with the amount and/or conditions of the reflected light. Among such electrical signals generated by the pickup 3, a reading signal mainly having a signal component corresponding to information recorded on the disc 1 (a so-called RF (Radio Frequency) signal) is amplified by an RF amplifier 4, and then supplied to a signal demodulator circuit 16. The signal demodulator circuit 16 reproduces a final audio or video signal or computer data signal from the RF signal. The audio and video signals are led, for example, to the outside of the player, while the data signal is supplied to a microcomputer 8.

In an exemplary manner of generating a reading signal, a quadrant photo-detector may be used, in which case the reading signal can be derived from a sum of optoelectrically transduced signals from all light receiving areas. The reading signal, however, may be generated from any other type of detector.

The pickup 3 is connected to a focus error generator circuit 5 and a tracking error generator circuit 21.

The focus error generator circuit 5 generates a focus error signal FE, representing an error of the reading light to a recording surface, from an electrical signal generated by the pickup 3. Giving an example of how to generate the focus error signal, a light receiving system of the pickup 3 may be configured such that reflected light from a disc is transmitted by a cylindrical lens to apply astigmatism to the reflected light, and the reflected light, which has transmitted the cylindrical lens, is received by a quadrant photo-detector. A light receiving surface of the quadrant photo-detector has four light receiving areas which are segmented by two straight lines orthogonally intersecting at the center of the light receiving surface. Based on the fact that the reflected light, received on the light receiving surface, exhibits changes in shape and intensity on the light receiving surface depending on a focusing state of the reading light on a recording surface of a disc, two sets of optoelectrically transduced signals generated by light receiving areas positioned in a point symmetrical relationship with respect to the center of the light receiving surface are added together, and a signal corresponding to a difference between the resulting two sum signals is output as a focus error signal.

Figure 3:
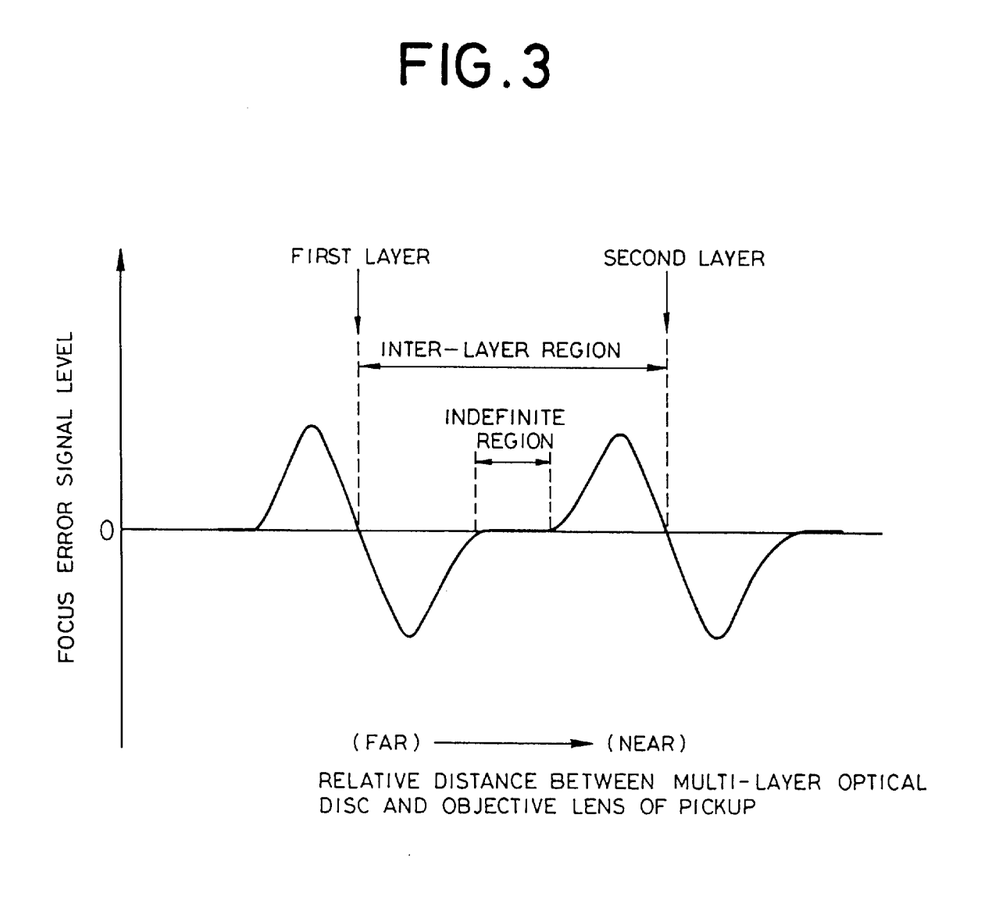
FIG. 3 is a graph representing the characteristic of a focus error signal which exhibits a change when focus jump is performed.

The focus error signal has the characteristic as illustrated in FIG. 3. Specifically, the focus error signal is output at zero level when a relative distance between each of the first and second layers and an objective lens of the pickup 3 is at a reference value. The output level continuously changes in a sinusoidal shape in accordance with a deviation of the relative distance from the reference value. In an inter-layer region between adjacent first layer and second layer, the focus error signal has opposite polarities for the first layer and the second layer. Also, an indefinite region is produced in a central portion of the inter-layer region, in which the focus error signal is not available.

The tracking error generator circuit 21 generates a tracking error signal in accordance with a phase difference method or a push-pull method using the output level of the aforementioned quadrant photo-detector. Of course, the tracking error signal may be generated using a three-beam method.

The pickup 3 also contains an actuator 30 for moving the objective lens for irradiating the disc 1 with reading light emitted from a light source in the direction of its optical axis as well as for driving the objective lens in a radial direction of the disc 1 perpendicular to the light axis. The actuator 30 displaces the objective lens 1 in a direction perpendicular to the surface of the disc 1 in response to the level and polarity of a focus driving signal, later described, and displaces the objective lens in the radial direction of the disc 1 in accordance with the level and polarity of a tracking driving signal, also later described.

The output of the focus error generator circuit 5 is connected to a zero-cross detector circuit 6 and an equalizer 7. The zero-cross detector circuit 6 detects when the level of the focus error signal FE output from the focus error generator circuit 5 intersects a positive threshold value +Vth1 and a negative threshold value +Vth2, both near a zero level, generates a zero-cross detecting signal FZC in accordance with the detection result, and supplies the zero-cross detecting signal FZC to the microcomputer 8. The equalizer 7 applies processing for waveform equalization on the supplied focus error signal FE, and supplies the equalized focus error signal to an adder 10 through a hold circuit 9.

The hold circuit 9 has a change-over switch 11a, an on-off switch 11b, and a capacitor 12. The capacitor 12 is supplied with an output signal from the equalizer 7 through the on-off switch 11b so that the output signal is accumulated thereon, when the on-off switch 11b is on. The on-off switch 11b is a uni-directional switch implemented by a transistor or the like, so that no current flows from the capacitor 12 through the on-off switch 11b. The change-over switch 11a selectively outputs one of an output signal of the equalizer 7 and a voltage accumulated on the capacitor 12 to the adder 10. During focus servo, the microcomputer 8 switches the change-over switch 11a to the path to the equalizer 11a, and turns the on-off switch 11b on.

The microcomputer 8 generates, based on the zero-cross detecting signal FZC, a kick pulse generation command signal for accelerating and displacing the actuator 30 in a predetermined direction, and a kick pulse generation stop command signal, as well as a brake pulse generation command signal for decelerating the actuator 30 in course of displacement instructed by the kick pulse to stop the displacement of the actuator 30 in the predetermined direction, and a brake pulse generation stop command signal. These command signals are supplied to a jump pulse generator circuit 13.

The jump pulse generator circuit 13 generates a set of jump pulses including a kick pulse KP and a brake pulse BP in response to the pulse generation command signal and the pulse generation stop command signal from the microcomputer 8, respectively, and provides the kick pulse KP and the brake pulse BP with corresponding polarities. The output of the jump pulse generator circuit 13 is connected to the adder 10.

The adder 10 adds a signal from the hold circuit 9 and the jump pulse from the jump pulse generator circuit 13, and supplies an addition output thereof to a focus driver amplifier 17. The driver amplifier 17 generates a focus driving signal in accordance with an output of the adder 10, and supplies the generated focus driving signal to the actuator 30.

The focus error generator circuit 5, the equalizer 7, the hold circuit 9, the adder 10, and the driver amplifier 17 forms a focus servo system.

The tracking error generator circuit 21 is connected to an equalizer 23 through an on-off switch 22. The equalizer 23 performs processing for waveform equalization on the tracking error signal TE supplied thereto when the on-off switch 22 is on, and supplies the equalized tracking error signal to a tracking driver amplifier 24. The driver amplifier 24 generates a tracking driving signal in accordance with the output of the equalizer 23 and supplies the tracking driving signal to the actuator 30. The tracking error generator circuit 21, the on-off switch 22, the equalizer 23, and the driver amplifier 24 form a tracking servo system.

The output of the equalizer 23 is connected to two equalizers 26, 27 through a selector switch 25. The equalizers 26, 27 are provided for extracting a lower frequency component in an output signal of the equalizer 23. In particular, since the tracking control cannot be achieved only with displacement of the objective lens in the radial direction of the disc by the actuator 30 in response to the aforementioned tracking driving signal, the lower frequency component is extracted as a carriage displacement amount signal. The equalizers 26, 27 have characteristics, for example, gain characteristics different from each other, so that the equalizer 26 is used to forwardly rotate a carriage motor 31 to read information recorded on the disc 1 from the inner peripheral side to the outer peripheral side, while the equalizer 27 is used to backwardly rotate the carriage motor 31 to read information recorded on the disc 1 from the outer peripheral side to the inner peripheral side. Outputs of the equalizers 26, 27 are connected to a driver amplifier 29 through a selector switch 28. The selector switches 25, 28 are associated with each other, such that the selector switch 25 selectively relays and supplies an output signal of the equalizer 23 to one of the equalizers 26, 27, while the selector switch 28 relays and supplies a carriage displacement amount signal output from the one equalizer to the driver amplifier 29. A control for selecting one from the selector switches 25, 28 is performed by the microcomputer 8. The driver amplifier 29 drives the carriage motor 31 in accordance with the carriage displacement amount signal. The carriage motor 31 moves the entire pickup 3 to the radial direction of the disc 1 through a slider 32.

The spindle motor 2 is rotated or driven by a spindle driving circuit 33. The spindle driving circuit 33 is connected to a spindle error generator circuit 34 through an on-off switch 35. The spindle error generator circuit 34 extracts a synchronization component from an output RF signal of the RF amplifier 4 to generate a spindle error signal in accordance with a difference between an extracted value and a reference value. The spindle driving circuit 33 rotates or drives the spindle motor 2 in accordance to the spindle error signal, so that the disc 1 is rotated in association with the rotation of the spindle motor 2.

Figure 4:
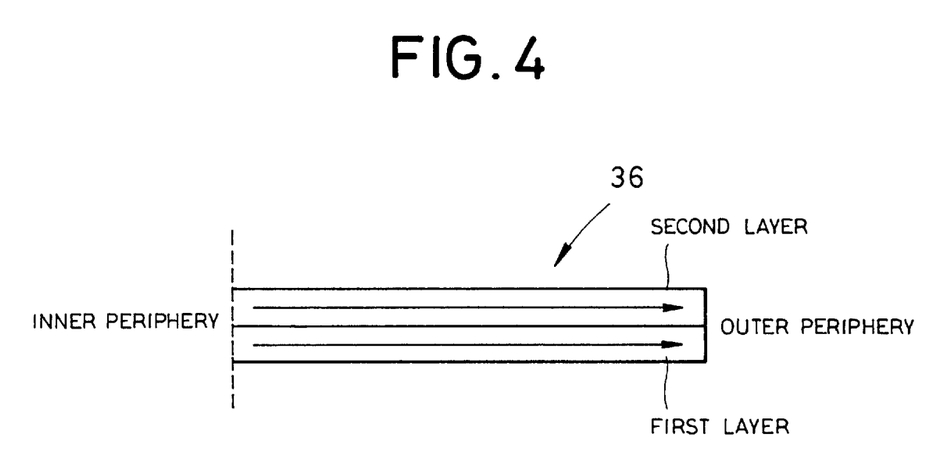
FIG. 4 is a schematic diagram illustrating a disc on which information is recorded in conformity to a parallel recording scheme.
Figure 5:
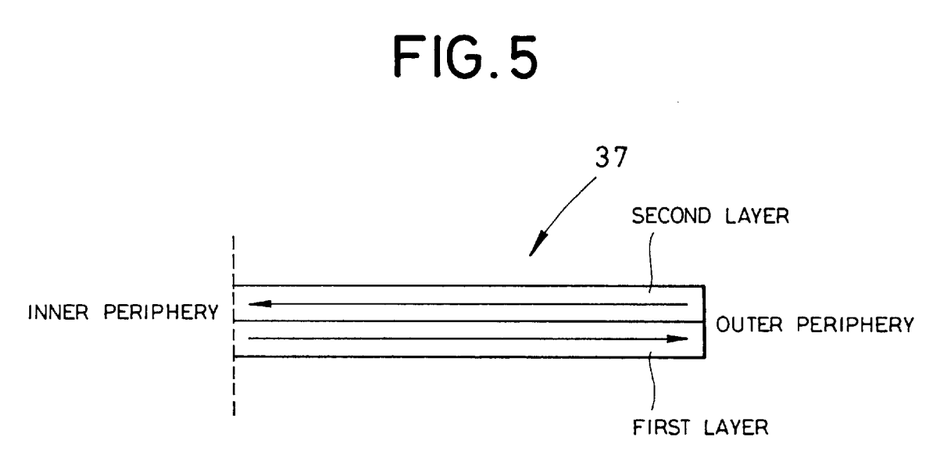
FIG. 5 is a schematic diagram illustrating a disc on which information is recorded in conformity to the opposite recording scheme.

Two-layer optical discs such as DVD (Digital Video Disc) and so on may be classified into a disc 36 of parallel recording scheme on which recorded information is written from the inner peripheral side to the outer peripheral side as indicated by arrows on both of a first layer and a second layer as illustrated in FIG. 4, and a disc 37 of opposite recording scheme on which recorded information is written from the inner peripheral side to the outer peripheral side on a first layer, as indicated by the lower arrow, and from the outer peripheral side to the inner peripheral side on a second layer as indicated by the upper arrow, i.e., in the reverse direction, as illustrated in FIG. 5. It should be noted here that in FIGS. 4 and 5, information is read by a pickup from the lower side of the disc.

Figure 6:
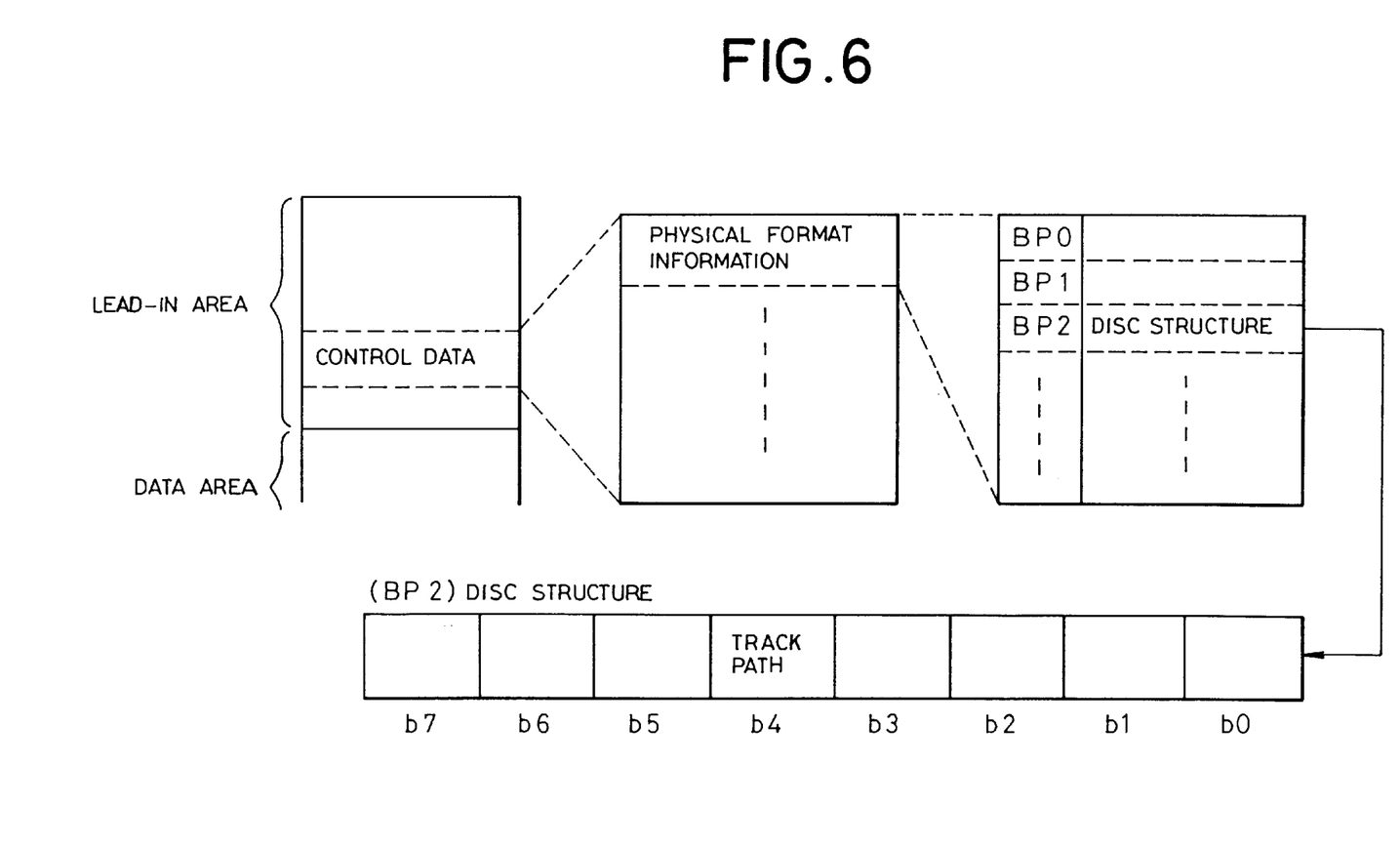
FIG. 6 shows a data structure in a lead-in area.

As illustrated in FIG. 6, a two-layer optical disc 1 includes a control data field in its lead-in area, and the control data field has a physical format information field. The physical format information field further has a region labelled "disc structure" in an item indicated by BP2. In the disc structure region, information labelled "track path" is written in an item indicated by b4. Since the track path indicates which of the parallel recording scheme and the opposite recording scheme is used for the disc 1, a particular recording scheme can be identified by discriminating this information.

Figure 7:
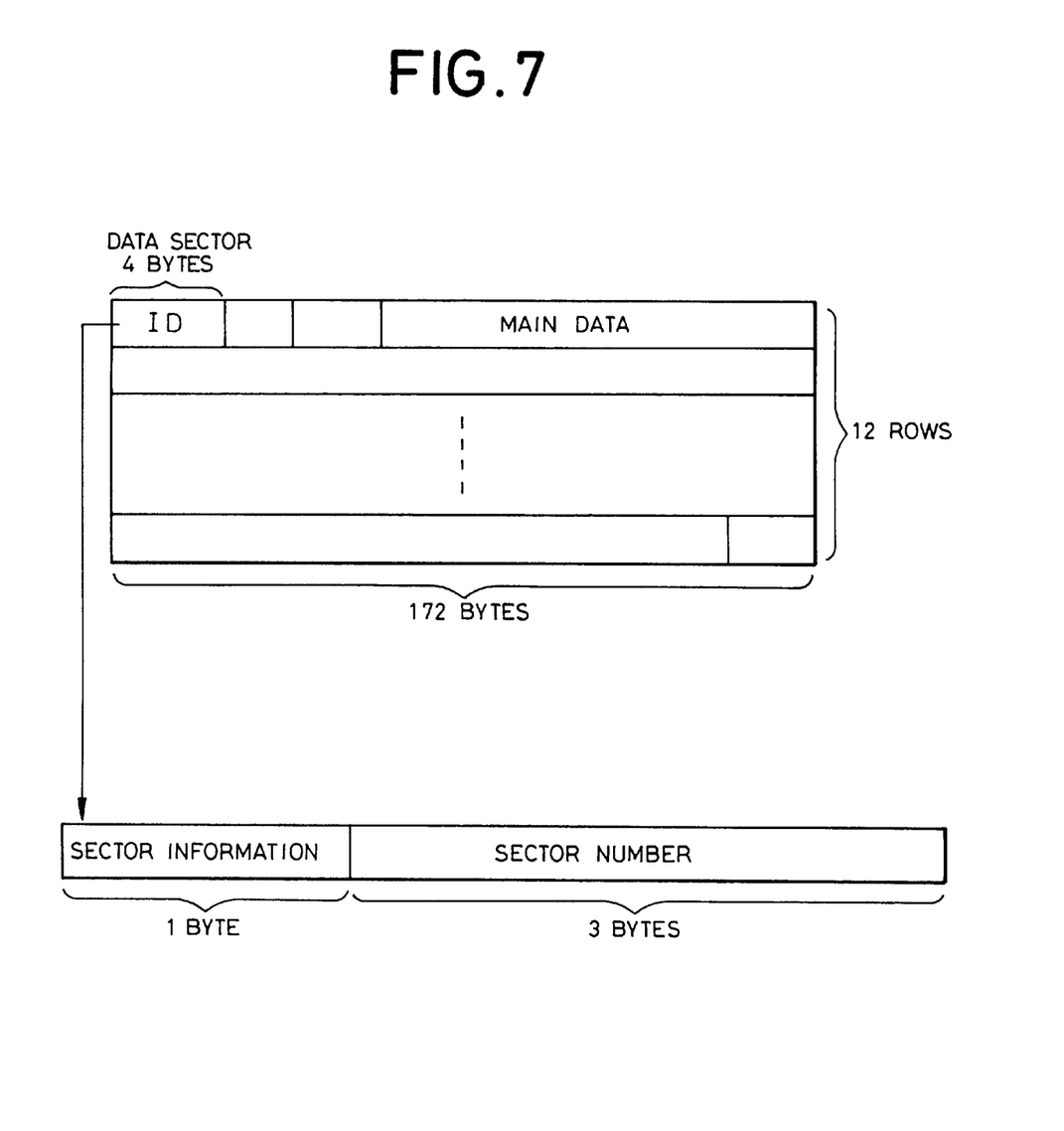
FIG. 7 shows a data structure in a data sector.

Also, a header in each data sector within a data area of the two-layer optical disc 1 includes a 4-byte ID (Identification Data), as illustrated in FIG. 7. The ID consists of 1-byte sector information and 3-byte sector number. In a disc of the opposite recording scheme, since the sector numbers of the first layer and the second layer, at respective positions spaced by the same distance from the center of the disc, have a mutually bit inverted relationship, it is possible to determine whether the disc 1 loaded in a player conforms to the parallel recording scheme or the opposite recording scheme by revealing the relationship.

Figure 8:
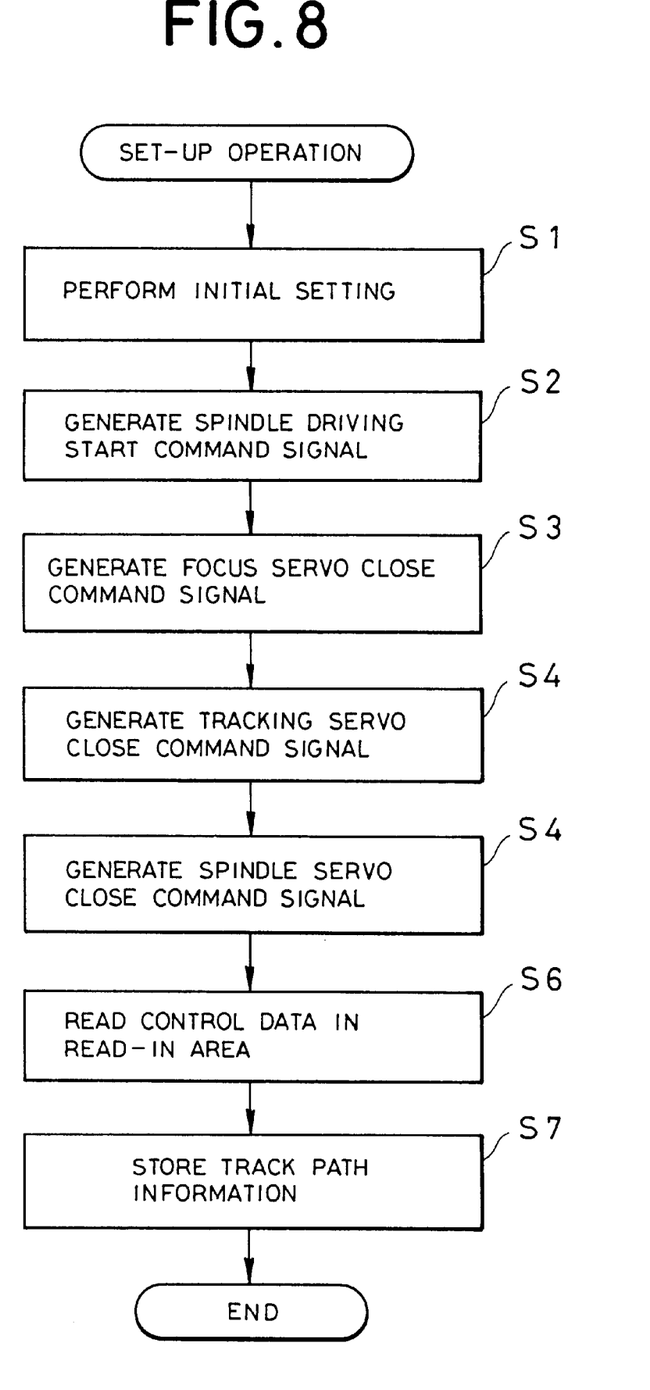
FIG. 8 is a flow chart illustrating a set-up operation.

The microcomputer 8 immediately starts a set-up operation if the disc 1 is loaded into a player. As illustrated in FIG. 8, the set-up operation begins with initial setting (step S1). Then, a spindle driving start command signal is issued to the spindle driving circuit 3 (step S2), to close the servo each time close information is ready. Specifically, a focus servo close command signal is first generated (step S3), then a tracking servo close command signal is generated (step S4), and a spindle servo close command signal is further generated (step S5).

As the spindle driving circuit 33 is supplied with the spindle driving start command signal, the spindle driving circuit 33 starts driving or rotating the spindle motor 2. The started rotation or driving causes a means, not shown, to generate a voltage in accordance with a rotating speed of the spindle motor 2. The generated voltage is compared with a reference voltage, and the spindle motor 2 is driven or rotated for rough adjustment so as to reduce the voltage. In response to the focus servo close command signal, the change-over switch 11a is switched to the path to the equalizer 7, the on-off switch 11b is turned on, and a focus error signal FE output from the focus error generator circuit 5 is supplied to the driver amplifier 17 through the equalizer 7, the hold circuit 9, and the adder 10. The driver amplifier 17 drives a mechanism (not shown) of the actuator 30 for moving the objective lens in the perpendicular direction so as to reduce the focus error signal FE supplied thereto.

In response to the tracking servo close command signal, the on-off switch 22 is turned on, so that a tracking error signal TE output from the tracking error generator circuit 21 is supplied to the driver amplifier 24 through the switch 22 and the equalizer 23. The driver amplifier 24 drives a mechanism (not shown) of the actuator 30 for moving the objective lens in the radial direction of the disc so as to reduce the tracking error signal TE supplied thereto.

Further, in response to the spindle servo close command signal, the on-off switch 35 is turned on. As the on-off switch 35 is turned on, the spindle servo control for rough adjustment is terminated, followed by a spindle servo control for fine adjustment. Specifically, a spindle error signal output from the spindle error generator circuit 34 is supplied to the spindle driving circuit 33 through the switch 35, and the spindle driving circuit 33 rotates or drives the spindle motor 2 so as to reduce the spindle error signal supplied thereto.

The microcomputer 8, after the execution of step S5, positions a reading point of the pickup 3 at the lead-in area of the disc 1 to read control data in the lead-in area from the output of the signal demodulator circuit 16 (step S6), and stores track path information included in the control data in a RAM 15 (step S7).

Figure 9:
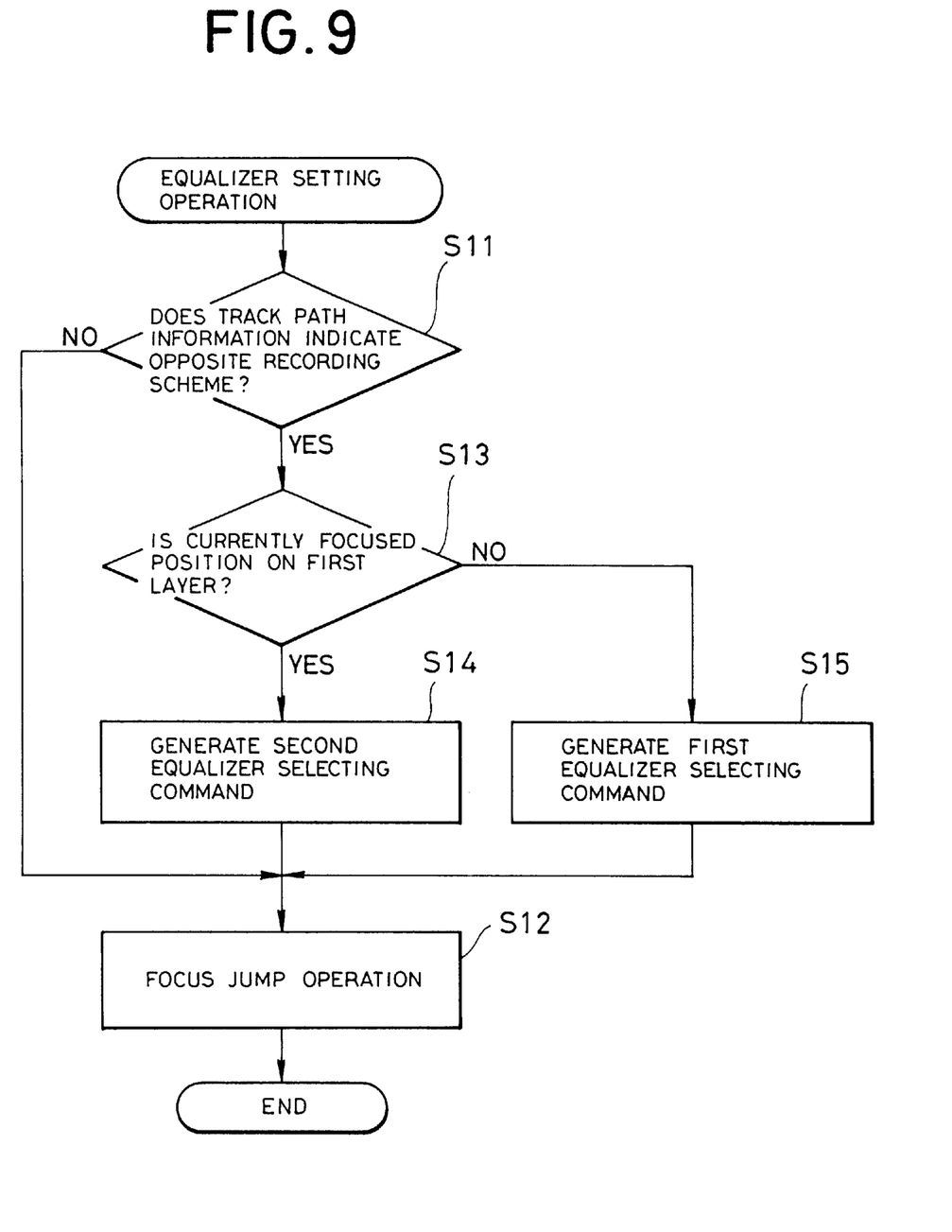
FIG. 9 is a flow chart illustrating an equalizer setting operation.

When the microcomputer 8 receives a focus jump command signal for moving a focused position of reading light to a recording surface of the other layer, for example, from a manipulation section 18 during reproduction or in a reproduction stand-by state, the microcomputer 8 interrupts the processing so far executed to start an equalizer setting operation illustrated in FIG. 9.

The microcomputer 8, when supplied with the focus jump command signal, first determines whether or not track path information stored in the RAM 15 indicates the opposite recording scheme (step S11), as illustrated in FIG. 9. If the track path information, determined by the set-up operation, indicates the parallel recording scheme, a focus jump operation is immediately executed (step S12). Conversely, if the track path information indicates the opposite recording scheme, it is determined whether or not the reading light is currently focused on the first layer (step S13). If the currently focused position is on the first layer, the destination of the focus jump is on the second layer, so that a second equalizer selecting command is generated for selecting the equalizer 27 (step S14). The selector switches 25, 28 select the equalizer 27 in response to the second equalizer selecting command to form a path from the output of the equalizer 23 to the driver amplifier 29 through the switch 25, the equalizer 27, and the switch 28. Conversely, if the currently focused position is on the second layer, the destination of the focus jump is on the first layer, so that a first equalizer selecting command is generated for selecting the equalizer 26 (step S15). The selector switches 25, 28 select the equalizer 26 in response to the first equalizer selecting command to form a path from the output of the equalizer 23 to the driver amplifier 29 through the switch 25, the equalizer 26, and the switch 28.

The microcomputer 8 proceeds to step S12 to execute the focus jump operation after the execution of step S14 or S15.

As described above, with a disc of the opposite recording scheme, an equalizer in a carriage servo system corresponding to an information reading direction on a destination layer is selected for the focus jump operation. It should be noted that the equalizer 26 is always selected irrespective of a jump destination layer when a disc conforms to the parallel recording scheme.

Figure 10:
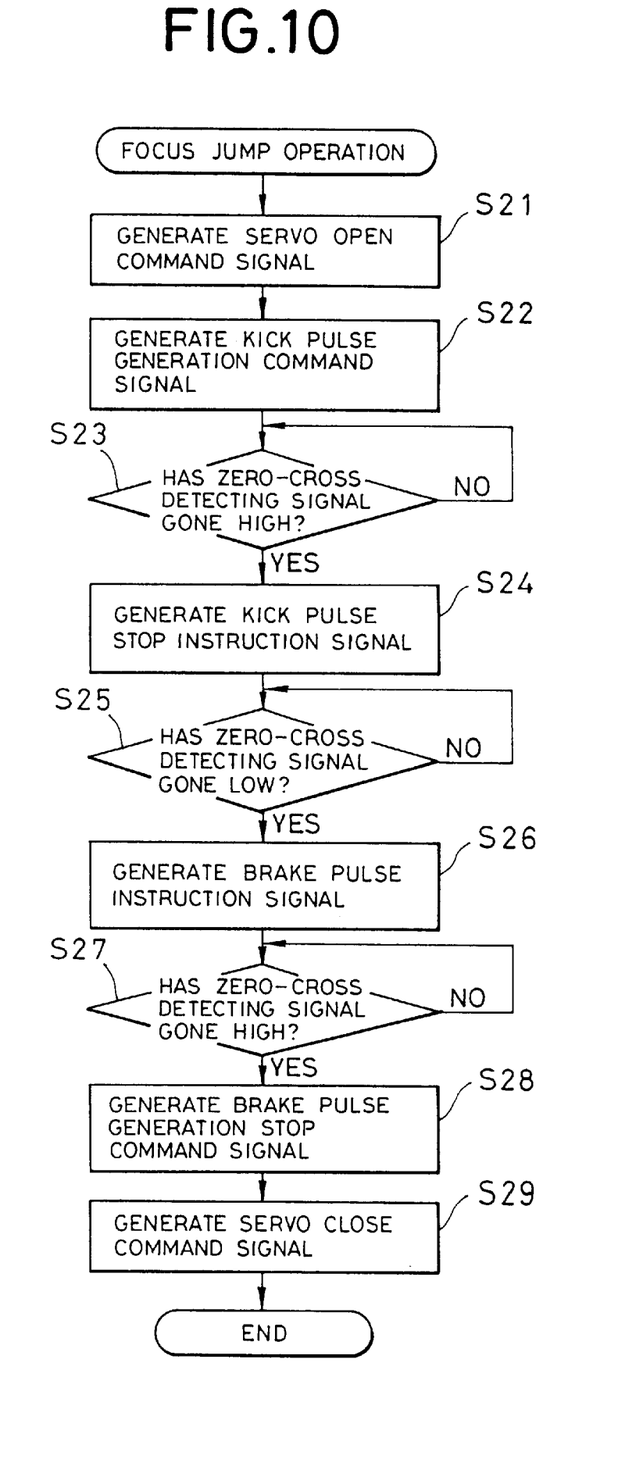
FIG. 10 is a flow chart illustrating a focus jump operation.

Next, the focus jump operation will be described. Assume herein that the focus jump operation moves a focused position from the recording surface of the first layer to the recording surface of the second layer of the disc 1.

Figure 11A:
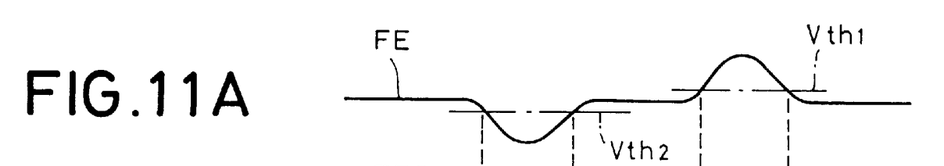
FIGS. 11A to 11D are waveform charts for explaining a focus jump operation.

As illustrated in FIG. 10, the microcomputer 8 first generates a servo open command signal SO (step S21) for the focus jump operation. The servo open command signal causes the change-over switch 11a of the hold circuit 9 to switch to the path to the capacitor 12 and also causes the on-off switch 11b to turn off. This brings the focus servo system into an off state, as illustrated in FIG. 1C. As a result, an accumulation level on the capacitor 12 of the hold circuit 9, i.e., a focus error signal level immediately before the focus servo system is brought into the off state is held and output to the adder 10. Then, the microcomputer 8 generates a kick pulse generation command signal (step S22). In response to the kick pulse generation command signal, the jump pulse generator circuit 13 generates a kick pulse as illustrated in FIG. 11D, and supplies the kick pulse to the adder 10. The adder 10 adds a high level of positive polarity indicated by the kick pulse and the hold level output from the hold circuit 9 to produce a sum output, and a driving signal corresponding to this sum output is supplied from the driver amplifier 17 to the actuator 30. Therefore, during a period in which the kick pulse is generated, the actuator 30 is forcedly accelerated in a direction in which a focused position of the reading light is moved to a new destination recording surface. With this acceleration of the actuator 30, the level of the focus error signal, which has remained substantially at a zero level, is increased in the negative direction, as the focused position of the reading light is brought further away from the recording surface on which the reading light has so far followed, as illustrated in FIG. 11A. After reaching a negative maximum value, the focus error signal again returns to the zero level, thus exhibiting a valley-shaped change.

Figure 11B:
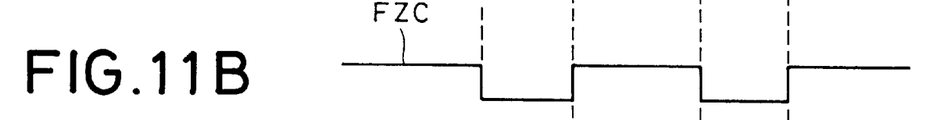
Figure 11C:
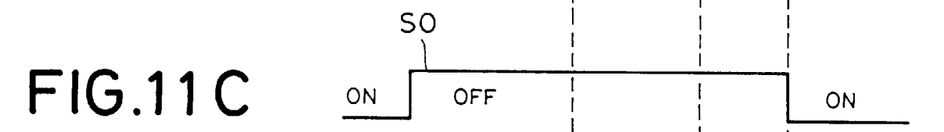
Figure 11D:
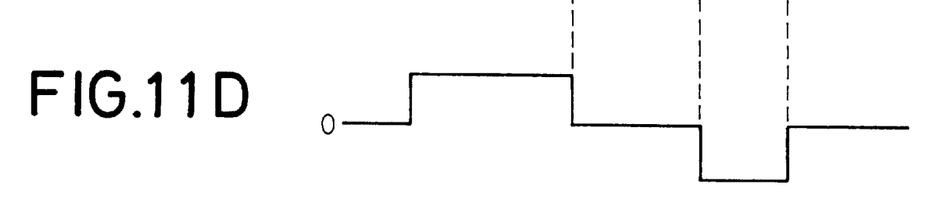

A zero-cross detecting signal FZC output from the zero-cross detector circuit 6, as illustrated in FIG. 11B, goes low when the level of the focus error signal FE falls from the zero level in the negative direction to pass a threshold value Vth2, and goes high when the level of the focus error signal FE passes the threshold value Vth2 immediately before it returns to the zero level.

After the execution of step S22, the microcomputer 8 determines whether or not the zero-cross detecting signal FZC has gone high (step S23). If the zero-cross detecting signal FZC has gone high, the kick pulse generation stop command signal is generated (step S24). The jump pulse generator circuit 13 stops generating the kick pulse in response to the kick pulse generation stop command signal.

After the jump pulse generator circuit 13 stops generating the kick pulse, the actuator 30 continues the displacement for moving the focused position of the reading light to the target recording surface of the second recording layer, although the moving speed is reduced, because of the moment of inertia of the driving conducted by the kick pulse. During this movement, the focus error signal FE returns substantially to the zero level, and then reaches the indefinite region. When the focused position of the reading light is further moved, the influence of the second layer will exert on the focus error signal FE. Specifically, the level of the focus error signal FE is gradually increased in the positive direction, and returns again to the zero level after reaching a positive maximum value by the influence of the second layer, thus exhibiting a valley-shaped change. As illustrated in FIG. 11B, the zero-cross detecting signal FZC goes low when the level of the focus error signal FE rises from the zero level in the positive direction and passes a threshold value Vth1, and subsequently goes high when the level of the focus error signal FE passes the threshold value Vth1 immediately before it returns to the zero level.

After the execution of step S24, the microcomputer 8 determines whether or not the zero-cross detecting signal FZC has gone low (step S25). If the zero-cross detecting signal FZC has gone low, a brake pulse generation command signal is generated (step S26). The jump pulse generator circuit 13 generates a brake pulse of negative polarity, as illustrated in FIG. 11D, in response to the brake pulse generation command signal, and supplies the brake pulse to the adder 10. The adder 10 adds this low level indicated by the brake pulse and a hold level from the hold circuit 9 to produce a sum output which is supplied to the driver amplifier 17. As a result, the actuator 30 is supplied with a driving signal for stopping the movement of the focused position of the reading light to a target recording surface, so far performed, so that the actuator 30 gradually reduces the displacement speed.

After the execution of step S26, the microcomputer 8 determines whether or not the zero-cross detecting signal FZC has gone high (step S27). If the zero-cross detecting signal FZC has gone high, the brake pulse generation stop command signal is generated (step S28). The jump pulse generator circuit 13 stops generating the brake pulse in response to the brake pulse generation stop command signal. Then, the microcomputer 8 generates a servo close command signal (step S29). The servo close command signal causes the change-over switch 11a of the hold circuit 9 to switch to the path to the equalizer 7, and the on-off switch 11b to turn on. As a result, the focus error signal is supplied to the driver amplifier 17 through the equalizer 7 and the adder 10. Subsequently, the actuator 30 carries out a normal focus servo operation for forcing the focused position of the reading light to follow the target recording surface of the second layer based on the focus error signal FE.

When the focus jump operation is eventually completed, the microcomputer 8 proceeds, for example, to a mode for reproducing information recorded on the recording surface of the second layer.

Figure 12:
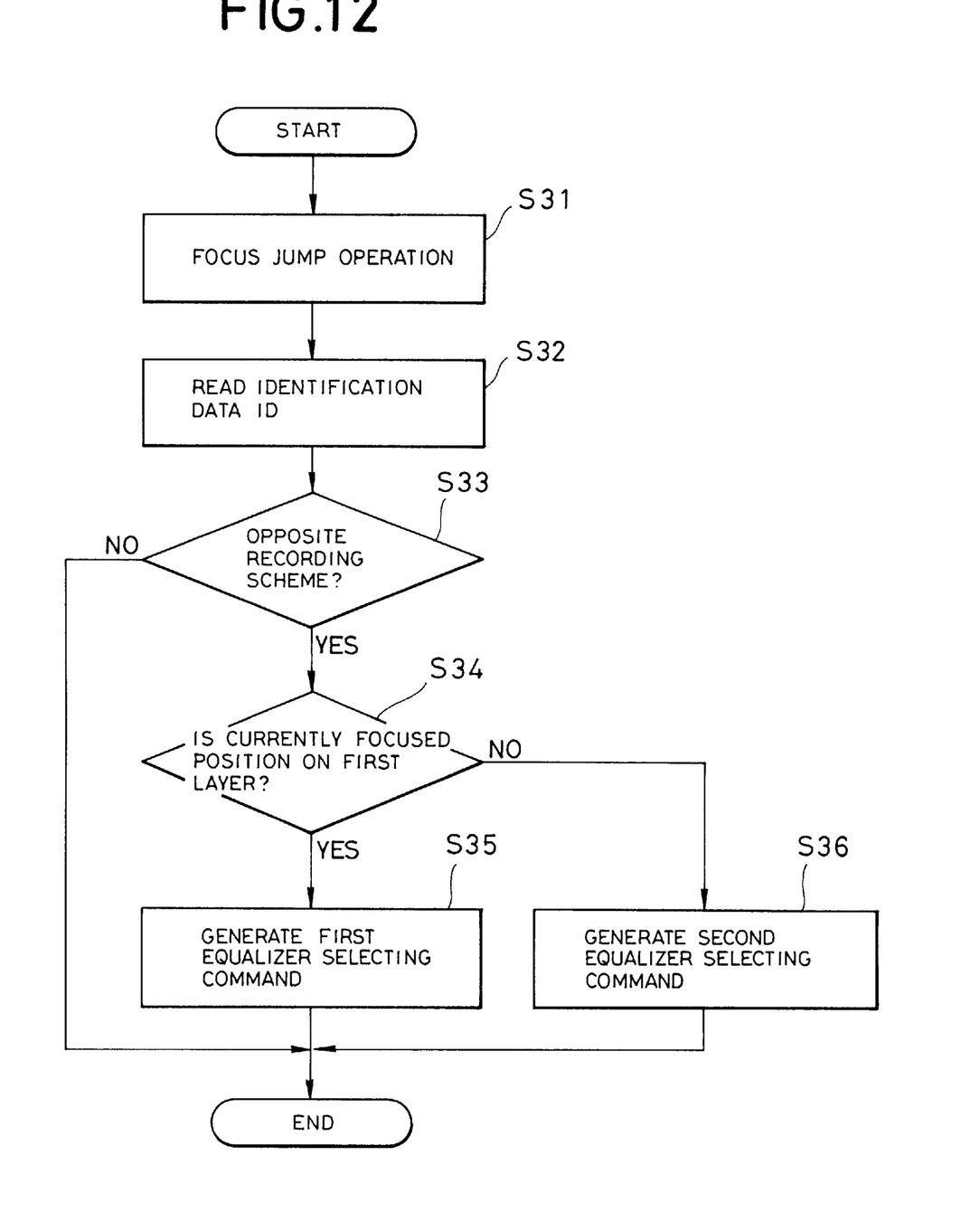
FIG. 12 is a flow chart illustrating another equalizer setting operation.

FIG. 12 illustrates an exemplary operation for selecting an equalizer in the carriage servo system after the focus jump operation has been completed. In this exemplary operation, when the focus jump operation as illustrated in FIG. 10 ends at step S31, identification data ID of a data sector on a target layer is read (step S32), and the read identification data ID is compared with identification data ID of a data sector on a layer before the jump to determine whether or not the disc 1 conforms to the opposite recording scheme (step S33). The identification data ID of the data sector on the layer before the jump has been read before the focus jump operation and stored in the RAM 15. As mentioned above in connection with a disc of the opposite recording scheme, since sector numbers in the identification data IDs of the first layer and the second layer, at respective positions spaced by the same distance from the center of the disc, have a mutually bit inverted relationship, it is possible to discriminate whether or not the disc 1 loaded in the player conforms to the parallel recording scheme or the opposite recording scheme from a comparison of the identification data ID read from the first layer and the second layer, respectively.

If the result of the determination at step S33 shows that the disc 1 conforms to the opposite recording scheme, it is determined whether or not the reading light is currently focused on the first layer (step S34). If the current focused position is on the first layer, a first equalizer selecting command is generated for selecting the equalizer 26 (step S35). Conversely, if the current focused position is on the second layer, a second equalizer selecting command is generated for selecting the equalizer 27 (step S36). If the disc 1 conforms to the parallel recording scheme, the equalizer 26 is selected as it is.

The foregoing embodiment is configured to select either of the equalizers 26, 27 with the switches 25, 28 in accordance with a reading direction when a disc of the opposite recording scheme is concerned. Alternatively, a single equalizer may be employed such that the characteristic of the equalizer is changed in accordance with a reading direction by adjusting coefficients and a delay time associated therewith. Further alternatively, the equalizers in the foregoing embodiment may be implemented by a DSP (digital signal processor).

Also, while the foregoing embodiment has been described in connection with a two-layer optical disc, the present invention is not limited to this particular medium, but may be applied to a carriage controller in an apparatus for reproducing a multi-layer optical disc having three or more layers. In addition, the present invention is not limited to the optical disc, but may be applied to any multi-layer discs, for example, a magnetic disc on which information is recorded on multiple layers.

By now, it will be appreciated that the present invention provides for a stable carriage control during reproduction of a multi-layer optical disc of the opposite recording scheme, even if a carriage motor is applied with different starting voltages in forward rotation and in backward rotation.

What is claimed is:

1. A carriage controller for reproducing a disc having an information recording surface on each of at least two layers formed in a direction perpendicular to a surface of the disc, comprising:

a pickup for reading information recorded on each layer of said disc;

a carriage motor for moving said pickup in a radial direction of the disc;

equalizer means for relaying a tracking error signal;

means for driving said carriage motor in response to an output signal of said equalizer means; and characteristic setting means for detecting an information reading direction on a layer from which information is to be read to set an equalizer characteristic in said equalizer means in accordance with the detection result.

2. A carriage controller for a multi-layer disc according to claim 1, further comprising determining means for determining whether or not information reading directions on the at least two layers of said disc are different from each other, and for storing the determination result.

3. A carriage controller for a multi-layer disc according to claim 1, wherein said characteristic setting means performs a characteristic setting operation when a determination result of said determining means shows that the information reading directions are different from each other.

4. A carriage controller for a multi-layer disc according to claim 2, wherein said characteristic setting means performs a characteristic setting operation when a determination result of said determining means shows that the information reading directions are different from each other.

5. A carriage controller for a multi-layer disc according to claim 1, wherein said characteristic setting means performs said characteristic setting operation when a reading point defined by said pickup is moved at a jump from one of the at least two layers of said disc to another layer.

6. A carriage controller for a multi-layer disc according to claim 3, wherein said characteristic setting means performs said characteristic setting operation when a reading point defined by said pickup is moved at a jump from one of the at least two layers of said disc to another layer.

7. A carriage controller for a multi-layer disc according to claim 4, wherein said characteristic setting means performs said characteristic setting operation when a reading point defined by said pickup is moved at a jump from one of the at least two layers of said disc to another layer.

8. A carriage controller for a multi-layer disc according to claim 2, wherein said determining means determines that the information reading directions are different from each other based on information recorded in a lead-in area of said disc.

9. A carriage controller for a multi-layer disc according to claim 2, wherein:

said disc has identification data in a head of each sector in said data area; and said determining means determines that the information reading directions are different from each other, after a reading point defined by said pickup has been moved at a jump from one of the at least two layers of said disc to another layer, by comparing identification data at a reading point on said one layer immediately before said movement with identification data at a reading point on said other layer immediately after said movement.

10. A carriage controller for a multi-layer disc according to claim 1, wherein said characteristic setting means sets at least one of a frequency characteristic and an output level of said equalizer means as said equalizer characteristic.

* * * * *